Figure 1:
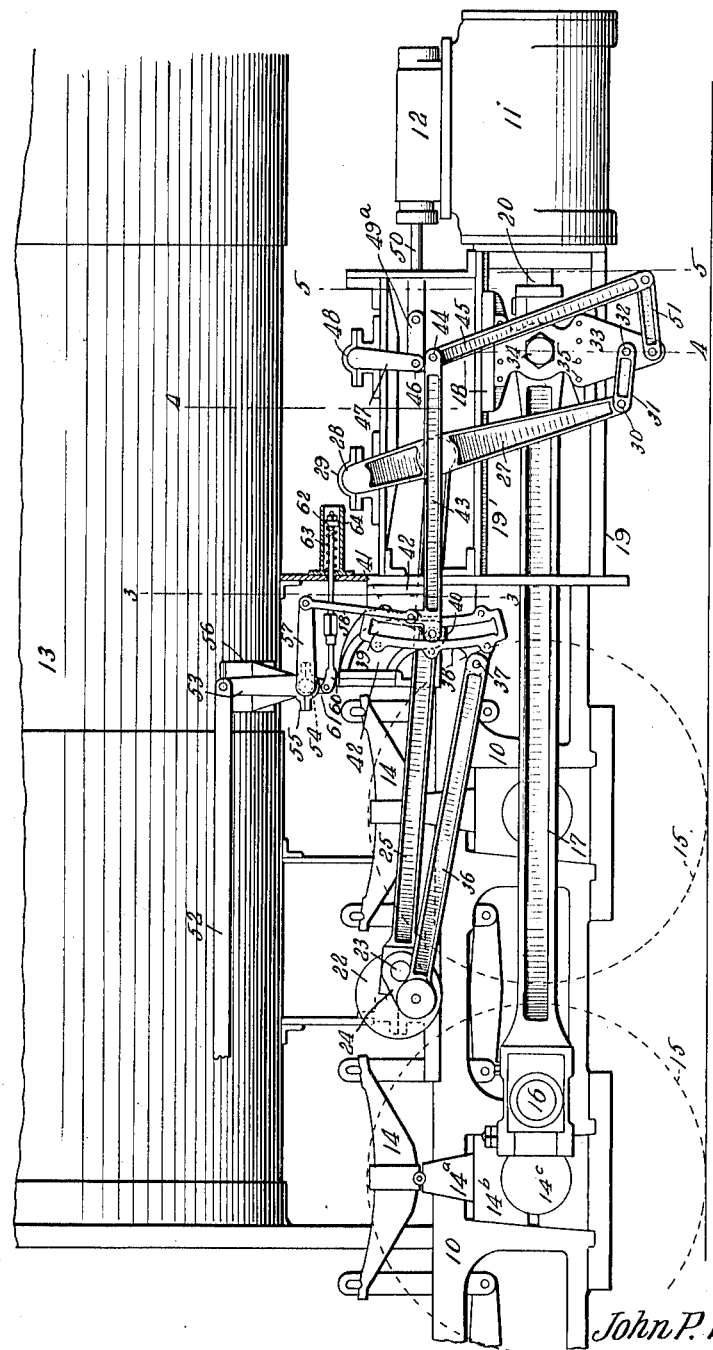

J. P. RAMSEY.
VALVE GEAR.
APPLICATION FILED OCT. 28, 1912.

1,071,793.

Patented Sept. 2, 1913.

2 SHEETS—SHEET 1.

Witnesses

Inventor
John P. Ramsey
By W. P. McElroy
Attorney

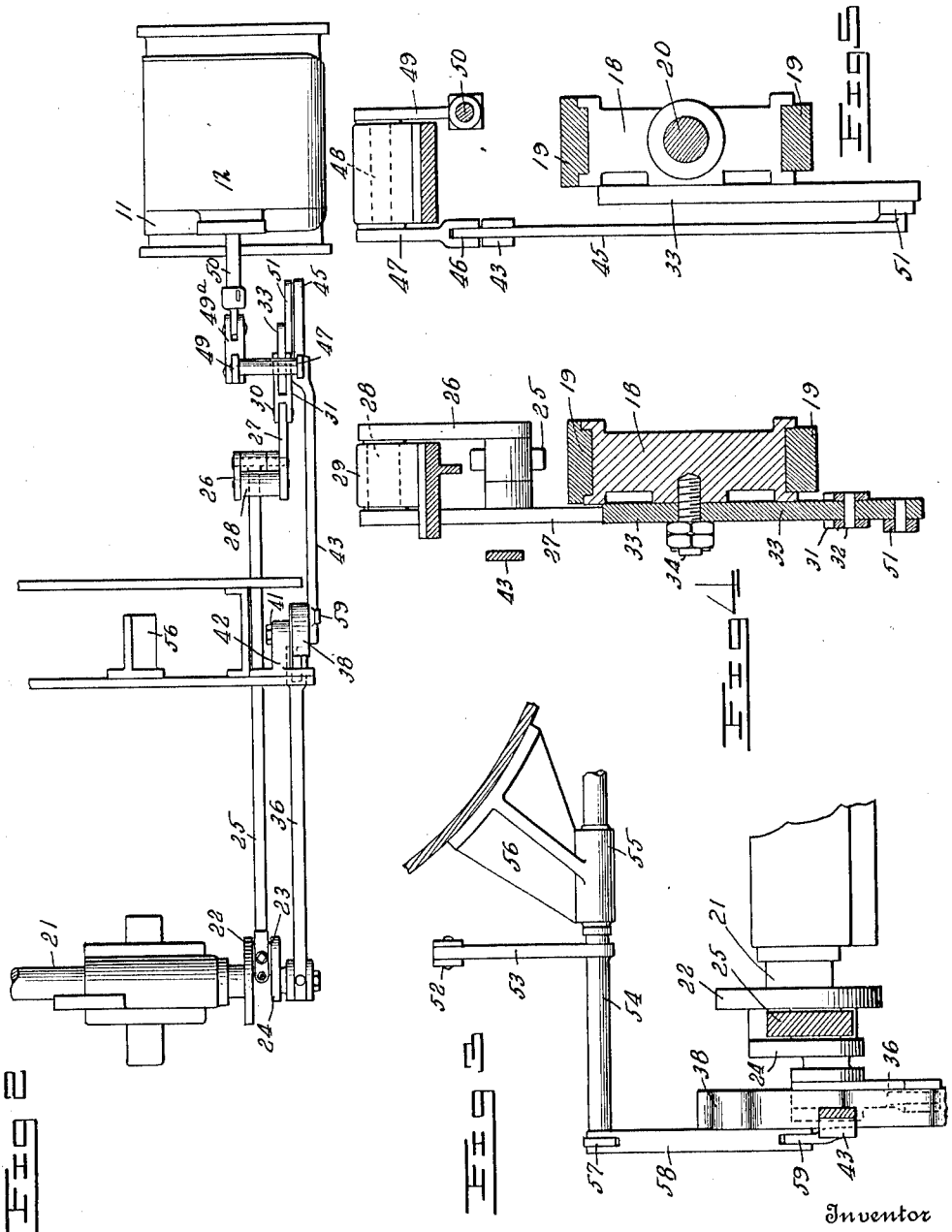

UNITED STATES PATENT OFFICE.

JOHN P. RAMSEY, OF SPRINGFIELD, ILLINOIS.

VALVE-GEAR.

1,071,793.

Specification of Letters Patent. Patented Sept. 2, 1913.

Application filed October 28, 1912. Serial No. 728,212.

*To all whom it may concern:*

Be it known that I, JOHN P. RAMSEY, a citizen of the United States, residing at Springfield, in the county of Sangamon and State of Illinois, have invented certain new and useful Improvements in Valve-Gears, of which the following is a specification.

This invention relates to valve gears, and in particular to valve gears suitable for use on locomotives; and it comprises in combination with a valve and a crosshead or other equivalent part of an engine, a rotatable member journaled on the engine frame and independent of the main driving axle of the engine, connections between said crosshead and said rotatable member for rotating the latter, and means for transmitting motion from said rotatable member to said valve, auxiliary valve-actuating means deriving motion from said crosshead being also best provided for modifying the motion transmitted to said valve from said rotatable member; all as more fully hereinafter set forth and as claimed.

Among the various types of engine valve gears heretofore proposed, one which has given more or less satisfaction in use, comprises in general a valve-actuating mechanism in which an eccentric connection to the main driving axle produces a valve motion derived from the rotation of the main driving axle. Such gears have many points of excellence, but they have been subject heretofore to a number of defects as a result of which they do not give satisfactory and economical distribution of steam.

As ordinarily constructed, the boiler and cylinders of a locomotive, together with the valves, crossheads and attendant parts, are supported and held in place by a heavy frame-work, the whole being suspended upon appropriate springs which in turn are carried by the axles and wheels. On account of the rolling motion of the boiler and the up and down movement permitted by the springs when the locomotive is in motion, the centers of the wheel axles are not always, as compared to the cylinders and valves, in the same relative position. It follows therefore that where the valve is connected directly with a crank attached to the main driving axle, the valve will have, in addition to the regular motion caused by the rotation of the main driving axle, an additional erratic motion or throw with each lateral or vertical movement of the boiler because of the lengthening or shortening of the distance between the crank and the valve. This irregular movement is of course uncertain and cannot be computed; and consequently it is not possible to accurately adjust the valve motion where this irregular movement occurs so as to regulate the use of steam with a sufficient degree of accuracy. As a result, while the gear may have been designed and arranged to give theoretically a certain distribution of steam, the variable relative movement or play between the engine frame and the axles greatly modifies this theoretical distribution by interfering with the regularity of the valve movements, thereby reducing the operating efficiency to a very considerable extent. Numerous attempts have been made heretofore to remedy this defect by varying the details of gear design to reduce the effect on the valve movements of the unavoidable play between the axles and the locomotive frame. None of these has proven satisfactory in practice, and as a rule the complexity of structure involved in such proposed gears has rendered them of little use. An engine gear to be practical for heavy service and rough usage such as is met with in daily practice, should have relatively few parts and the arrangement of these should be as simple as possible.

An object of the present invention is to provide a valve gear for locomotive and other engines, which avoids the stated objections and defects in gears hitherto proposed, and to attain certain new and desirable advantages.

An important characteristic of the present gear is the provision of a valve shaft or other suitable rotatable member arranged to be driven, through appropriate connections, by the crosshead, or other equivalent part having substantially the same motion as the crosshead. Rods, levers, links or the like, transmit motion from the valve shaft to the valve itself. At any point in the stroke the motion thus transmitted to the valve may be modified or reversed by the use of a link, or other suitable device in the manner hereinafter shown.

In a typical embodiment of my invention as applied to a locomotive, the valve shaft is journaled in stationary bearings attached to the engine frame, and extends transversely thereof. A rod or a combination of rods and levers connects a crank at each end of the valve shaft with the corresponding crosshead, the arrangement of parts being such that the reciprocation of the crosshead produces complete rotary motion of the valve shaft. A return crank or other eccentric device whose virtual arm is at an angle, ordinarily 90 degrees, to that of its corresponding main crank is also provided at each end of the valve shaft and by means of a rod or similar connections rocks a pivotally mounted reversing link. Suitable rods and levers adjustably secured to the reversing link connect the latter with the valve and transmit reciprocatory motion thereto. In order to adjust and modify the valve motion thus produced and to provide for lap and lead, the actuating mechanism just described may be connected to the crosshead in such manner as to receive a modifying oscillatory motion therefrom, the combined actuating forces being thus adjusted to give the valve movements necessary to effect the desired distribution of steam in the cylinder.

Since, in the structure just described, the valve gear is carried entirely by the engine frame upon which, as before stated, the cylinders, valves, etc., are mounted and is not connected to the running gear, it is evident that the operation of the valve gear and valves is not affected by the motion of the engine frame relative to the running gear. In other words, the valve, the rotatable member by which it is actuated, and the reciprocable engine part which produces rotation of said member, are mounted on supports whose positions relative to each other are substantially fixed. Consequently, with the valve gear and valves set for a given steam distribution, this distribution is substantially not interfered with or varied under practical running conditions, thus enabling the attainment of greater operating efficiency than is usual and a material saving in water and fuel. The improved structure of the present invention permits of locating the gear above and out of the way of the drivers, which is obviously an important consideration. At the same time, the desirable results sought in the gears heretofore proposed, in which the valve movements were due to and derived from the rotation of the main driving axle, are attained without the necessity of any connection to such main driving axle.

In the accompanying drawings is illustrated, more or less diagrammatically, a typical embodiment of apparatus elements within the scope of the present invention, showing my improved valve gear as applied to a locomotive engine.

In these drawings Figure 1 is a side elevation of the gear and portions of a locomotive; Fig. 2 is a skeleton view of the gear in plan; and Figs. 3, 4 and 5 are cross sections on the lines 3—3, 4—4, and 5—5, respectively, of Fig. 1, showing details of construction.

Referring to the drawings, the engine frame is designated generally by reference character 10. Mounted on the engine frame are cylinder 11, valve-housing 12 and boiler 13. The engine frame with the several parts mounted thereon is supported on springs 14, carried by saddles $14^a$ which bear on journal boxes $14^b$ riding on the axles $14^c$ of the running gear of the locomotive, the wheels 15 of said runnng gear being indicated in dotted lines. The driver is provided with crank 16 to which main rod 17 is suitably secured at one end, the opposite end being pivotally secured to cross-head 18 moving in guides 19.

20 is a piston rod secured to the crosshead.

Journaled on the engine frame and extending transversely thereof is valve shaft 21 provided at each end with crank disk 22, to which is fixed driving crank 23. Return crank 24 is rigid with the said driving crank, the virtual arms of said cranks being at an angle of approximately 90° with each other. Secured to the driving crank of the valve shaft is rod 25 which is pivotally secured between the arms 26 and 27 of an unsymmetrical yoke lever, member 28 of the said yoke lever constituting a rock shaft and being supported in a suitable bearing 29, on the frame. The long arm 27 of said yoke lever extends downwardly and is pivoted at 30 to a short double or forked link 31 which in turn is pivotally secured at 32 to plate 33 suitably secured, as by bolts 34 and 35, to the crosshead.

Suitably secured to the return crank is an eccentric rod 36 which is pivoted at 37 to a reversing link 38 provided with slot 39 within which is adjustably positioned block 40. The reversing link is pivotally secured at its mid point 41 to bracket 42 rigidly fastened, as by bolts, to a part of the engine frame. Pivoted to the link block 40 is rod 43 whose other end is pivoted at 44 to floating or differential lever 45, whose upper end is pivotally connected to forked end 46 of arm 47 carried by rock shaft 48 journaled on the frame. Arm 49 carried by the rock shaft is pivotally linked through member $49^a$ to valve stem 50. The differential lever extends downwardly and is pivotally connected at its lower end as by link member 51 to the plate secured to said crosshead.

Reach rod 52 is pivoted to the upper end of arm 53 fast with rock shaft 54 carried in suitable bearings 55 by brackets 56. Arm 57, also fast with said rock shaft, is pivoted to reversing link 58, which in turn is pivoted to a lug 59 on rod 43. The linkwork just described constitutes means for varying the cut off by shifting the position of the link block and the end of rod 43 into intermediate positions in the link slot, or for reversing the operation of the valve and hence of the locomotive. A counterpoising device may be provided to balance the weight sustained by the end of arm 57, if desired. This may take the form of a rod 60 pivoted to a short arm 61 secured to the rock shaft and provided near its opposite end with a collar 62 against which presses spring 63 working in a casing 64 secured to the engine frame.

The parts above described constitute the arrangement of the valve gear structure on one side of the locomotive. A similar arrangement of parts exists of course on the opposite side of the engine, but it is deemed unnecessary to illustrate in the drawings or to describe in detail such similar arrangement.

The operation of my new valve gear is sufficiently obvious from the foregoing description. The reciprocation of the crosshead, transmitted through the linkwork comprising members 31, 27, and 25 to the driving crank 23, causes the continuous rotation of valve shaft 21. This motion is transmitted through the return crank, rod 36, the reversing link, rod 43, differential lever 45 and yoke 47, to the stem of the valve, thus producing reciprocation of the valve. The motion thus transmitted to the valve from the valve shaft is modified to a certain extent by that resulting from the connection of the crosshead directly to the differential lever 45. Assuming for example, that the cranks on the valve shaft are set 90° apart, the lead of the valve will be invariable. The point 44 at which 43 is secured to differential lever 45 may be so selected that when the point is substantially stationary, as when in mid-gear adjustment, the valve is moved a distance equal to the lap and lead on each side of center position. Instead of driving the valve shaft through oscillating lever 27 and rod 25, I may employ a direct driving connection from the crosshead to the crank disk on the valve shaft. This arrangement offers no particular advantages over that here illustrated; and the action of the valve is not as uniform and smooth as in the arrangement here illustrated. Cut-off may be varied as desired by shifting the linkblock in the slot of the reversing link to any intermediate position; and moving the linkblock from one side of mid-gear position to the other of course reverses the engine.

What I claim is:—

1. In an engine, the combination with a valve, a crosshead, and a supporting frame, of a valve gear comprising a rotatable member mounted on said frame, driving means connecting said crosshead and said rotatable member and arranged to rotate the latter, and valve actuating means connecting said rotatable member with said valve.

2. In an engine, the combination, with a valve, a crosshead, and a supporting frame, of a valve gear comprising a valve shaft mounted on said frame, linkwork connecting said crosshead with said shaft and arranged to rotate said shaft, and valve actuating means, including a reversing device, for transmitting motion from said shaft to said valve.

3. In an engine, the combination, with a valve, a crosshead, and a supporting frame, of a valve gear comprising a valve shaft mounted on said frame, linkwork connecting said crosshead with said shaft and arranged to rotate said shaft, valve actuating means, including a reversing device, for transmitting motion from said shaft to said valve, and further means connecting said valve actuating means with said crosshead for modifying the motion transmitted to said valve.

4. In an engine, the combination with a valve, a crosshead, and a supporting frame, of a valve gear comprising a valve shaft journaled in said frame, a driving crank and a return crank rigid with said shaft, driving members connecting said crosshead with said driving crank and arranged to revolve said shaft, an eccentric rod pivoted to said return crank and to a reversing link, a valve rod shiftably connected at one end to said reversing link and at the other through suitable connections to the stem of said valve, and linkwork connecting said stem directly to said crosshead.

5. In a locomotive engine, the combination with a suitable valve and a crosshead both carried by a frame, a valve shaft mounted on said frame and independent of the engine drivers and axles, driving means connecting said crosshead with said shaft and arranged to revolve said shaft, and means including a reversing link for transmitting motion from said shaft to said valve.

6. In a locomotive engine, the combination with a suitable valve and a crosshead both carried by a frame, a valve shaft mounted on said frame and independent of the engine drivers and axles, driving means connecting said crosshead with said shaft and arranged to revolve said shaft, means including a reversing link for transmitting motion from said shaft to said valve, and further means connected to said crosshead and coöperating with such motion-transmitting means for modifying the motion of said valve.

7. An engine valve gear comprising, in combination with a valve and a reciprocating part of the engine, a revoluble member rigidly mounted with respect to said valve and said reciprocating part, means connecting said reciprocating part with said revoluble member for revolving the latter, and means for transmitting motion from said revoluble member to said valve.

8. An engine valve gear comprising, in combination with a valve and a reciprocating part of the engine, a revoluble member rigidly mounted with respect to said valve and said reciprocating part, means connecting said reciprocating part with said revoluble member for revolving the latter, means for transmitting motion from said revoluble member to said valve, and means driven by said crosshead for modifying the motion thus transmitted.

9. In a locomotive engine, in combination with a valve and a crosshead, a valve shaft rigidly mounted with respect thereto, members operatively connecting said crosshead with said shaft for revolving said shaft, an eccentric rod arranged to be operated by said shaft and connected to a reversing link, valve actuating members connecting said reversing link with said valve, and driving connections between said crosshead and said linkwork for modifying the valve motion.

10. In a locomotive engine, the combination with the engine frame and a valve and crosshead rigidly supported thereon, of a valve shaft journaled on said frame, a driving crank on said shaft, a lever pivoted on said frame and suitably connected to said crosshead, a main rod connecting said crank and said lever, a return crank rigid with said driving crank, a reversing link, an eccentric rod connecting said return crank and said reversing link, a floating lever pivoted to an arm pivotally carried by said engine frame, a rod connecting said reversing link with said floating lever, a link connecting said crosshead with said floating lever, and means connecting said floating lever with said valve.

11. In a locomotive, the combination with a valve and a reciprocable engine part, of a rotatable member, means for driving said rotatable member from said reciprocable engine part, and means for transmitting motion from said rotatable member to said valve, said valve, reciprocable engine part and rotatable member being carried on suitable supports whose positions relative to each other are substantially fixed.

In testimony whereof, I affix my signature in the presence of two subscribing witnesses.

JNO. P. RAMSEY.

Witnesses:
 W. C. WESTMAN,
 L. T. BABCOCK.

---

Copies of this patent may be obtained for five cents each, by addressing the "Commissioner of Patents, Washington, D. C."